(12) United States Patent
Reddy et al.

(10) Patent No.: US 12,531,861 B2
(45) Date of Patent: *Jan. 20, 2026

(54) HIERARCHICAL CASE MODEL ACCESS ROLES AND PERMISSIONS

(71) Applicant: Open Text Corporation, Waterloo (CA)

(72) Inventors: Satyapal P. Reddy, Fremont, CA (US); Muthukumarappa Jayakumar, Mountain House, CA (US); Arnaud Viltard, Concord, CA (US); Ravikumar Meenakshisundaram, Pleasanton, CA (US)

(73) Assignee: Open Text Corporation, Waterloo (CA)

( * ) Notice: Subject to any disclaimer, the term of this patent is extended or adjusted under 35 U.S.C. 154(b) by 17 days.

This patent is subject to a terminal disclaimer.

(21) Appl. No.: 17/161,293

(22) Filed: Jan. 28, 2021

(65) Prior Publication Data

US 2021/0152559 A1    May 20, 2021

Related U.S. Application Data

(63) Continuation of application No. 15/998,885, filed on Aug. 16, 2018, now Pat. No. 10,911,454, which is a continuation of application No. 14/145,048, filed on Dec. 31, 2013, now Pat. No. 10,122,717.

(51) Int. Cl.
| | |
|---|---|
| *H04L 29/06* | (2006.01) |
| *G06F 21/60* | (2013.01) |
| *G06F 21/62* | (2013.01) |
| *H04L 9/40* | (2022.01) |

(52) U.S. Cl.
CPC ............ *H04L 63/10* (2013.01); *G06F 21/604* (2013.01); *G06F 21/6218* (2013.01)

(58) Field of Classification Search
CPC ..... G06F 21/604; G06F 21/6218; H04L 63/10
See application file for complete search history.

(56) References Cited

U.S. PATENT DOCUMENTS

| | | |
|---|---|---|
| 5,537,526 A | 7/1996 | Anderson et al. |
| 5,778,222 A | 7/1998 | Herrick et al. |
| 5,960,200 A | 9/1999 | Eager et al. |
| 7,080,077 B2 | 7/2006 | Ramamurthy et al. |
| 7,792,860 B2 | 9/2010 | Shrivastava et al. |
| 8,402,514 B1 | 3/2013 | Thompson et al. |
| 8,452,726 B2 | 5/2013 | Kuruganti et al. |

(Continued)

OTHER PUBLICATIONS

Notice of Allowance issued for U.S. Appl. No. 16/858,366, mailed Aug. 6, 2021, 13 pages.

(Continued)

*Primary Examiner* — Joseph P Hirl
*Assistant Examiner* — Chi D Nguy
(74) *Attorney, Agent, or Firm* — Sprinkle IP Law Group

(57) ABSTRACT

Hierarchical case model access roles and permissions are described. A system creates, for a child node associated with a parent node in a case model, a reference to a case role associated with the parent node. The system assigns another set of access permissions to the reference. The system determines access to the child node based on the set of access permissions in response to a request associated with the case role to access the child node.

17 Claims, 7 Drawing Sheets

(56) References Cited

U.S. PATENT DOCUMENTS

| | | | |
|---|---|---|---|
| 9,189,756 | B2 | 11/2015 | Gilbert et al. |
| 9,319,356 | B2 | 4/2016 | Odell et al. |
| 9,405,929 | B1 | 8/2016 | Van Rotterdam et al. |
| 9,449,182 | B1 | 9/2016 | Dang |
| 9,934,401 | B2 | 4/2018 | Van Rotterdam et al. |
| 10,032,124 | B1 | 7/2018 | Reddy et al. |
| 10,122,717 | B1 | 11/2018 | Reddy et al. |
| 10,182,056 | B1 | 1/2019 | Reddy et al. |
| 10,235,645 | B2 | 3/2019 | Rotterdam et al. |
| 10,609,034 | B2 | 3/2020 | Reddy et al. |
| 10,681,053 | B2 | 6/2020 | Rotterdam et al. |
| 10,778,688 | B2 | 9/2020 | Reddy et al. |
| 10,911,454 | B2 | 2/2021 | Reddy et al. |
| 11,218,484 | B2 | 1/2022 | Rotterdam et al. |
| 11,381,565 | B2 | 7/2022 | Reddy et al. |
| 11,943,225 | B2 | 3/2024 | Reddy et al. |
| 11,973,760 | B2 | 4/2024 | Van Rotterdam et al. |
| 11,985,131 | B2 | 5/2024 | Reddy et al. |
| 12,284,186 | B2 | 4/2025 | van Rotterdam |
| 12,341,780 | B2 | 6/2025 | Reddy et al. |
| 2004/0162906 | A1 | 8/2004 | Griffin et al. |
| 2004/0181442 | A1 | 9/2004 | Hensel et al. |
| 2004/0250120 | A1 | 12/2004 | Ng |
| 2006/0064434 | A1 | 3/2006 | Gilbert et al. |
| 2006/0089932 | A1* | 4/2006 | Buehler ............. G06F 21/6218 707/999.009 |
| 2006/0218394 | A1 | 9/2006 | Yang |
| 2006/0230042 | A1* | 10/2006 | Butler ................ G06F 21/6227 707/999.009 |
| 2007/0044144 | A1 | 2/2007 | Knouse et al. |
| 2007/0179890 | A1 | 8/2007 | Sandford et al. |
| 2008/0052203 | A1 | 2/2008 | Beyer et al. |
| 2008/0155652 | A1* | 6/2008 | DeBie .................. G06F 21/604 726/2 |
| 2008/0288532 | A1 | 11/2008 | Aboukrat et al. |
| 2008/0307505 | A1 | 12/2008 | Persaud-Deolall et al. |
| 2009/0119298 | A1 | 5/2009 | Faitelson et al. |
| 2009/0171897 | A1 | 7/2009 | Spinola et al. |
| 2010/0082133 | A1 | 4/2010 | Chouinard et al. |
| 2011/0302133 | A1 | 12/2011 | Kuruganti et al. |
| 2012/0011161 | A1* | 1/2012 | Marathe ................ G06Q 10/06 707/E17.01 |
| 2012/0054636 | A1 | 3/2012 | Robertson-Hodder |
| 2012/0059906 | A1 | 3/2012 | Ciancio-Bunch et al. |
| 2012/0137360 | A1 | 5/2012 | Henderson |
| 2012/0304247 | A1 | 11/2012 | Badger et al. |
| 2013/0144911 | A1 | 6/2013 | Watanabe |
| 2014/0201136 | A1* | 7/2014 | Smid .................... G06F 21/604 707/610 |
| 2015/0040234 | A1* | 2/2015 | Grack .................. G06F 21/604 726/26 |
| 2016/0203157 | A1 | 7/2016 | Kuruganti et al. |
| 2016/0357984 | A1 | 12/2016 | Van Rotterdam et al. |
| 2018/0204020 | A1 | 7/2018 | Rotterdam et al. |
| 2018/0341892 | A1 | 11/2018 | Reddy et al. |
| 2019/0052639 | A1 | 2/2019 | Reddy et al. |
| 2019/0124087 | A1 | 4/2019 | Reddy et al. |
| 2019/0173886 | A1 | 6/2019 | Van Rotterdam et al. |
| 2020/0322339 | A1 | 10/2020 | Rotterdam et al. |
| 2020/0403998 | A1 | 12/2020 | Reddy et al. |
| 2022/0337594 | A1 | 10/2022 | Reddy et al. |
| 2024/0179151 | A1 | 5/2024 | Reddy et al. |
| 2024/0275789 | A1 | 8/2024 | van Rotterdam et al. |
| 2024/0275790 | A1 | 8/2024 | Reddy et al. |

OTHER PUBLICATIONS

Office Action issued for U.S. Appl. No. 16/834,813, mailed Oct. 12, 6 pages.
Notice of Allowance issued for U.S. Appl. No. 16/834,813, mailed Feb. 24, 2022, 11 pages.
Office Action issued for U.S. Appl. No. 17/009,437, mailed Jun. 29, 2022, 10 pages.
Office Action for U.S. Appl. No. 14/502,246, mailed Dec. 31, 2015, 8 pgs.
Office Action for U.S. Appl. No. 14/502,222, mailed Jan. 5, 2017, 7 pgs.
Office Action for U.S. Appl. No. 14/502,222, mailed May 26, 2017, 9 pgs.
Office Action for U.S. Appl. No. 15/198,862, mailed Jun. 29, 2017, 9 pgs.
Office Action for U.S. Appl. No. 14/502,194, mailed Aug. 30, 2017, 13 pgs.
Office Action for U.S. Appl. No. 14/145,048, mailed Jan. 29, 2015, 8 pgs.
Office Action for U.S. Appl. No. 14/145,048, mailed Aug. 7, 2015, 10 pgs.
Office Action for U.S. Appl. No. 14/145,048, mailed Jan. 19, 2016, 10 pgs.
Office Action for U.S. Appl. No. 14/145,048, mailed Jul. 14, 2016, 10 pgs.
Office Action for U.S. Appl. No. 14/145,048, mailed Dec. 30, 2016, 10 pgs.
Office Action for U.S. Appl. No. 14/145,048, mailed Jul. 12, 2017, 10 pgs.
Office Action for U.S. Appl. No. 14/502,222, mailed Oct. 25, 2017, 8 pgs.
Office Action for U.S. Appl. No. 15/918,751, mailed Jul. 23, 2018, 8 pgs.
Office Action for U.S. Appl. No. 15/998,885, mailed Apr. 1, 2019, 9 pgs.
Office Action for U.S. Appl. No. 16/015,048, mailed Aug. 2, 2019, 7 pgs.
Office Action for U.S. Appl. No. 15/998,885, mailed Oct. 17, 2019, 9 pgs.
Office Action for U.S. Appl. No. 16/222,932, mailed on Dec. 3, 2019, 8 pages.
Office Action for U.S. Appl. No. 15/998,885, mailed on Mar. 17, 2020, 10 pages.
Office Action for U.S. Appl. No. 15/998,885, mailed on Sep. 22, 2020, 10 pages.
Office Action issued for U.S. Appl. No. 17/009,437, mailed Dec. 1, 2022, 6 pgs.
Notice of Allowance for U.S. Appl. No. 17/009,437, mailed Feb. 24, 2023, 5 pages.
Office Action issued for U.S. Appl. No. 17/856,792, mailed Dec. 6, 2022, 8 pages.
Office Action issued for U.S. Appl. No. 17/524,718, mailed Jan. 20, 2023, 10 pages.
Notice of Allowance issued for U.S. Appl. No. 17/009,437, mailed Jun. 23, 2023, 5 pages.
Notice of Allowance for U.S. Appl. No. 17/856,792, mailed Jun. 14, 2023, 9 pages.
Office Action issued for U.S. Appl. No. 17/524,718, mailed Jun. 20, 2023, 9 pages.
Notice of Allowance issued for U.S. Appl. No. 17/524,718, mailed Oct. 5, 2023, 8 pages.
Notice of Allowance issued for U.S. Appl. No. 17/856,792, mailed Oct. 17, 2023, 9 pages.
Notice of Allowance issued for U.S. Appl. No. 17/856,792, mailed Jan. 31, 2024, 9 pages.
Notice of Allowance issued for U.S. Appl. No. 17/524,718, mailed Feb. 1, 2024, 8 pages.
Notice of Allowance issued for U.S. Appl. No. 18/611,948, mailed Jan. 24, 2025, 8 pages.
Notice of Allowance issued for U.S. Appl. No. 18/436,097, mailed Feb. 28, 2025, 9 pages.
Office Action issued for U.S. Appl. No. 18/611,975, mailed May 12, 2025, 7 pages.
Office Action issued for U.S. Appl. No. 18/611,948, mailed Sep. 27, 2024, 10 pages.
Office Action issued for U.S. Appl. No. 18/436,097, mailed Sep. 28, 2024, 10 pages.

* cited by examiner

```
1  ▲ ◉ casemodel
2     ▲ ▤ CaseModel -> DataModel
3        ▷ ➡ rootnode : CaseNode
4  ▲ ◉ datamodel
5     ▲ ▤ CaseNode -> DataModel
6        ▷ ➡ lifecycle : Lifecycle
7        ▷ ▫ minOccurs : EInt
8        ▷ ▫ maxOccurs : EInt
9        ▷ ⛊ caseroles : CaseRole
10       ▷ ⛊ dataPermissions : CasePermisson
11       ▷ ⛊ rolePermissions : CasePermisson
12       ▷ ⛊ phasePermissions : PhasePermission
13       ▷ ⛊ dataServiceContracts : DataServiceContract
14    ▷ ▤ CaseContainerNode -> CaseNode
15    ▷ ▤ CaseLeafNode -> CaseNode
16 ▲ ◉ permissions
17    ▲ ▤ CaseRole -> Identity
18       ▷ ▽ name : EString
19       ▷ ▫ label : EString
20    ▷ ▤ DescendentCaseRoleAlias -> CaseRole
21    ▲ ✿ Permissions
22       – CREATE = 0
23       – READ = 1
24       – UPDATE = 2
25       – DELETE = 3
26    ▲ ▤ CasePermisson
27       ▷ ⛊ roles : Identity
28       ▷ ⛊ phases : Phase
29       ▷ ⛊ permissions : Permissions
30    ▷ ▤ PhasePermission
```

FIG. 7

HIERARCHICAL CASE MODEL ACCESS ROLES AND PERMISSIONS

CROSS-REFERENCE TO RELATED APPLICATION

This application is a continuation of, and claims a benefit of priority from U.S. patent application Ser. No. 15/998,885, filed Aug. 16, 2018, entitled "HIERARCHICAL CASE MODEL ACCESS ROLES AND PERMISSIONS," issued as U.S. Pat. No. 10,911,454, which is a continuation of, and claims a benefit of priority from U.S. patent application Ser. No. 14/145,048, filed Dec. 31, 2013, entitled "HIERARCHICAL CASE MODEL ACCESS ROLES AND PERMISSIONS," issued as U.S. Pat. No. 10,122,717, all of which are fully incorporated by reference herein for all purposes.

BACKGROUND

The exponential growth of available data, coupled with an increasing complexity of customer and regulatory data requirements, has presented challenges to information management organizations. These challenges have led to the application of data models and case management solutions to organize data and effectively communicate relevant business metrics. Traditionally used in social services, healthcare, banking, insurance, and legal environments, case management solutions are rapidly expanding into many other industries as organizations recognize that case management solutions can be used to make data easily accessible, up-to-date, quickly tracked, and more manageable in the context of business processes. For example, Documentum® xCP 2.0, provided by EMC® Corporation, is a software development platform that provides case management solutions to customers and business partners.

BRIEF DESCRIPTION OF THE DRAWINGS

FIG. 7 is one example of software instructions that can implement the tree structure of FIG. 3, FIG. 4, FIG. 5, or FIG. 6, under an embodiment.

DETAILED DESCRIPTION

Most case management solutions are custom-built solutions that rely on the data and its relationships to write stateless processes or build custom code to describe the case model. However, case management solutions typically cannot create hierarchical case models or assign the complex hierarchical case model access roles and permissions required for case models based on case roles. Case management solutions use custom code or custom build processes without a case model instead of using hierarchical case models. Thus, it would be desirable to have generic processes for creating hierarchical case models and assigning complex hierarchical case model access roles and permissions that avoid any need for customized code solutions.

Embodiments herein provide hierarchical case model access roles and permissions. A hierarchical case model specifies a folder/container structure for a particular case. For example, in a loan case model, the system can model one folder for "income documents", one folder for "home inspection documents," etc. In other words, the case management system may create an "income documents" node that is a child node of a "financial" parent node. In this regard, the case management system may create, for an income documents node that is a child node of a financial node for a loan case model, a reference to a loan applicant case role for the financial node. In general, a system creates for a child node associated with a parent node in a case model, a reference to a case role associated with the parent node.

The system assigns a set of access permissions to the reference. For example, the case management system assigns the access permission to read the income documents node to the reference to the loan applicant case role. The system determines access to the child node based on the assigned set of access permissions in response to a request associated with the case the income documents node from a user interface that specifies the loan applicant case role for the requestor by enabling the requestor to read the income documents node because the reference to the loan applicant case role is assigned the access permission to read the income documents node. The case management system creates references to case roles for hierarchical case models, and assigns access permissions for the references to the case roles, without the need for an application developer to create any custom code for any hierarchical case models.

Figure 1:
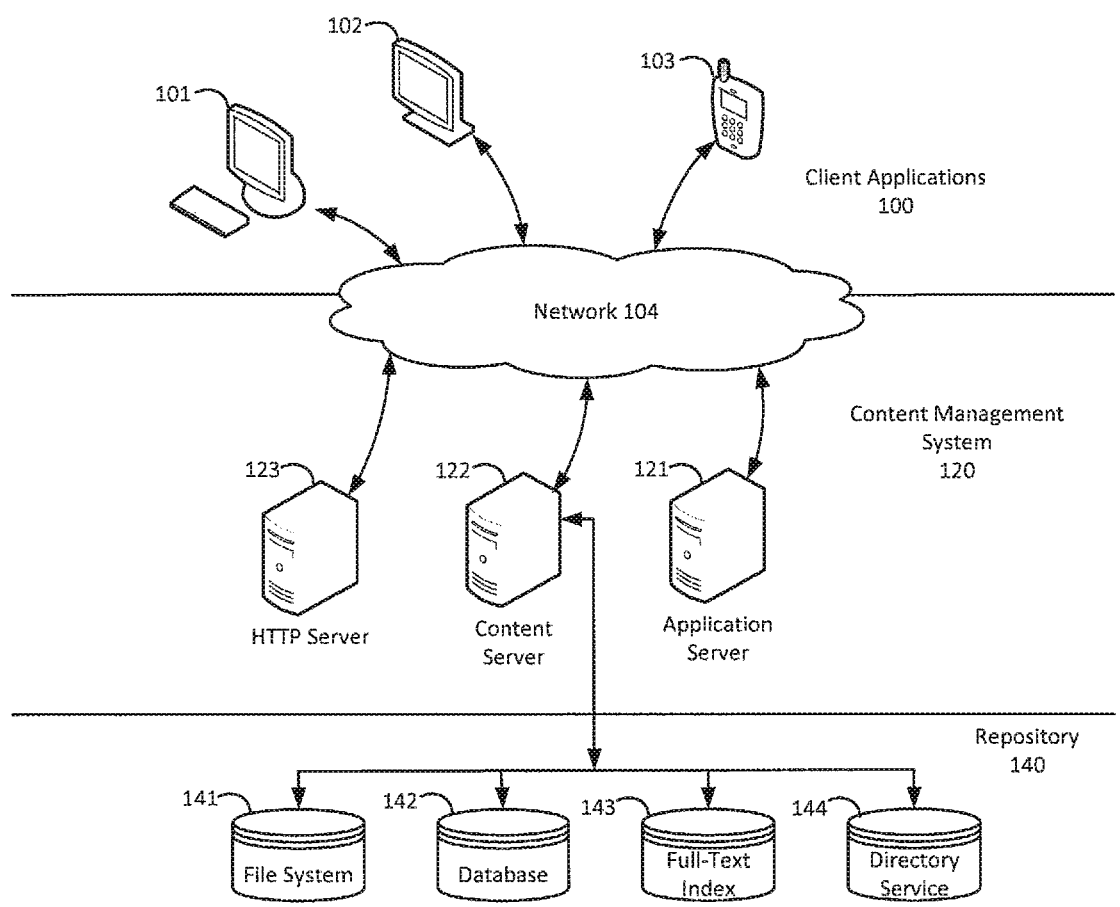
FIG. 1 is a block diagram illustrating a distributed computing system.

Prior to describing the subject matter in detail, an exemplary hardware device in which the subject matter may be implemented is described. Those of ordinary skill in the art will appreciate that the elements illustrated in FIG. 1 may vary depending on the system implementation. FIG. 1 illustrates one embodiment of a system for providing an enterprise-level managed content service. Client applications 100 access a content management system 120, which operates and manages a repository system 140.

The use of the client applications 100 originates from client devices, such as devices 101, 102, 103, which communicate through a network 104 with an application server 121 in order to use one or more applications hosted in part or entirely on the application server. In one embodiment, the network 104 is an Ethernet connection using conventional TCP/IP communication methods with both client devices and server devices. However, other types of network connection technologies are well known and may also be used to full advantage, including local area network (LAN), wide area network (WAN), storage area network (SAN), the Internet, etc. Client devices may be any type of processor-based digital device, such as desktop, laptop computer, tablet, smartphone or other smart hand-held device.

The application server 121 hosts one or more applications running on a content management platform that provides access to the repository 140 for clients hosted on a content server 122, which is also accessible to clients via the network 104. An HTTP server 123 is also coupled to the network 104 to provide an administrative terminal for system operators to perform system maintenance, logging, access control, etc.

The repository 140 is provided for use by the client applications 100, through the content server 122, which is accessible to the client devices through the network 104. The repository 140 may include a file store 141 for storing content items, a relational database 142 for storing attributes/metadata associated with the content items, a full-text index store 143 for the content items, and directory services 144.

A software platform runs on each of the various components, such as the Documentum® Platform software and related Enterprise Content Management software, provided by EMC® Corporation, Hopkington, Massachusetts. The Documentum® Platform provides capabilities for managing enterprise content and is the foundation for related content management and case management product offerings. Creating hierarchical case models and assigning complex hierarchical case model access roles and permissions may be performed using other platform and enterprise content management software products known in the art.

Figure 2:
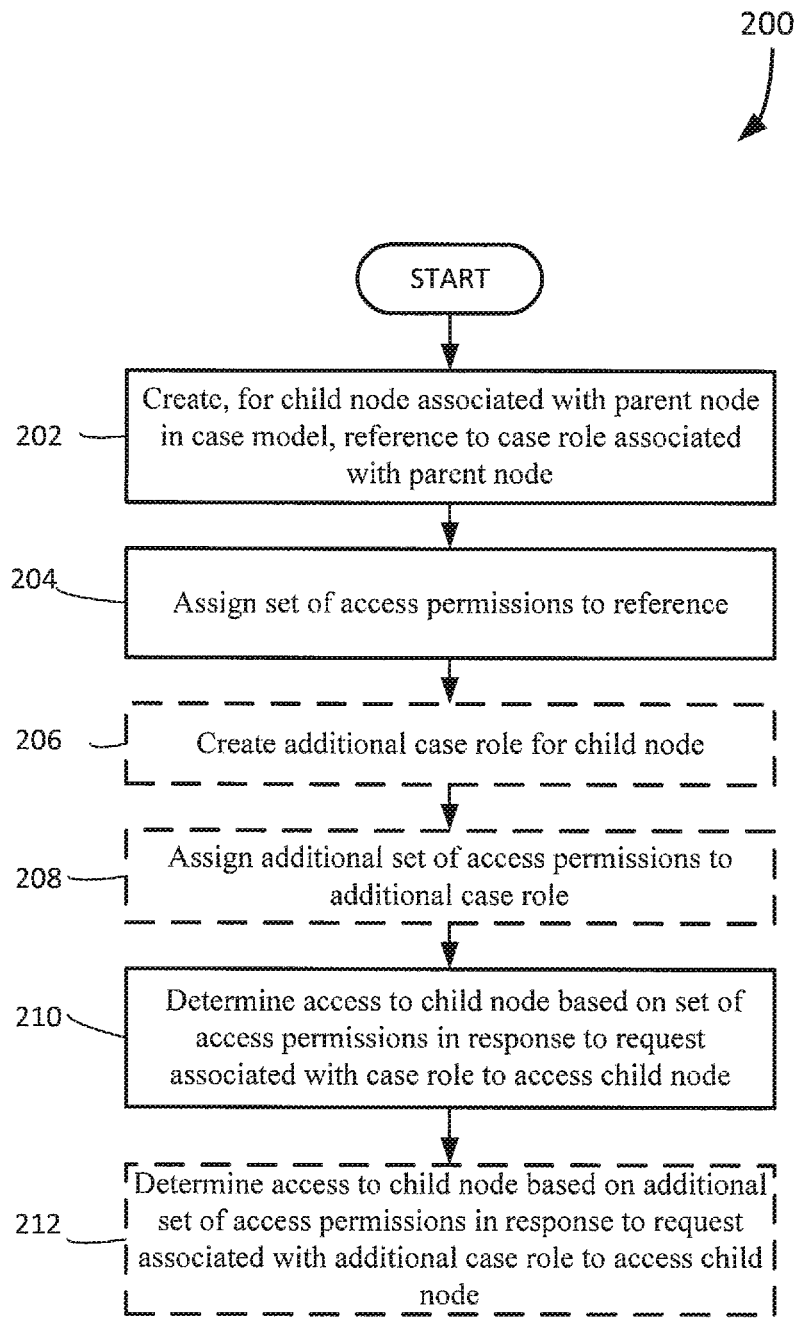
FIG. 2 is an example flow chart illustrating a process for hierarchical case model access roles and permissions, under an embodiment.

FIG. 2 is a flowchart that illustrates a method for hierarchical case model access roles and permissions, under an embodiment. Flowchart 200 illustrates method acts illustrated as flowchart blocks for certain steps involved in and/or between the client devices 101, 102, or 103 and/or the servers 121, 122, or 123 of FIG. 1.

A reference to a case role associated with a parent node in a case model is created for a child node associated with the parent node, block 202. For example, a case management system creates, for an income documents node that is a child of a financial node for a loan case model, a reference to a loan applicant case role for the financial node. Although this example describes a case role that is associated with a parent node, a case role may be associated with any type of node. Examples of parent nodes and child nodes are described below in reference to FIG. 3 and FIG. 4. Although this example describes case management system creating a reference to case role for a child node, the case management system has the option to delete a reference to a case role for a child node. For example, a supervisor of staff members has all of the access permissions to a parent node, and a child node of the parent node contains confidential staff member evaluations of the supervisor. The case management system assigns read access for the confidential staff member evaluations only to the superior of the supervisor, but the system deletes the supervisor's access permissions to the confidential staff member evaluations even though the confidential staff member evaluations are contained in a node that is a child of the parent node for which the supervisor has all access permissions.

A set of access permissions is assigned to a reference, block 204. For example, the case management system assigns the read permission to the reference to the loan applicant case role for the income documents node based on user input that specifies the read permission. The case management system may assign any set of permissions to a case role from a group of permissions that includes a create permission, a read permission, an update/edit permission, a delete permission, and a no access permission. In another example, the case management system assigns the read permission to the reference to the loan applicant case role for the income documents node because the reference to the loan applicant case role for the income documents node inherits the loan applicant case role's read permission for the financial node. Although this example describes the reference to the case role inheriting the set of permissions for a child node from the original case role's set of permissions for the parent node, the case management system may assign an additional access permission to the reference to the case role for the child node that is absent from the original case role's set of access permissions for the parent node and/or delete an access permission from the reference to the case role for the child node that is present in the original case role's set of access permissions for the parent node.

The case management system may assign the create permission, the update permission, and the delete permission to the reference to the loan applicant case role in addition to its read permission for the income documents node, thereby providing the reference to the loan applicant case role with all of the access permissions for the income documents node. The case management system may also delete the create permission, the update permission, and the delete permission from the reference to the loan administrator case role's permissions for the income documents node, leaving the reference to the loan administrator case role with only the read permission for the income documents node.

An additional case role is optionally created for a child node, block 206. For example, the case management system creates a home inspector case role for a home details node, even though in this example a home inspector case role did not exist for the loan node, which is the parent node for the home details node. In this manner, the case management system may create additional case roles as needed for child nodes.

An additional set of access permissions is optionally assigned to an additional case role, block 208. For example, the case management system assigns the read permission for the home details node to the home inspector case role. In this manner, the case management system may assign additional access permissions to an additional case role when the additional case role does not have a corresponding case role for the parent node or when the additional case role uses different access permissions than the corresponding case role's access permissions for the parent node. The case management system executes the blocks 202-208 at design time, and executes the following blocks 210-212 at run time.

Access to a child node is determined based on a set of access permissions, block 210. For example, the case management system responds to a request to read the income documents node from a user interface that specifies the loan applicant case role for the requestor by enabling the requestor to read the income documents node because the reference to the loan applicant case role is assigned the access permission to read the income documents node. Although this example describes a request to access a child node, a request may be to access any type of node.

Access to a child node is optionally determined based on an additional set of access permissions, block 212. For example, the case management system responds to a request to read the home details node from a user interface that specifies the home inspector case role for the requestor by enabling the requestor to read the home details node based on the access permissions for the home inspector case role to read the income documents node. Although this example describes a request to access a child node, a request may be to access any type of node. Although FIG. 2 depicts the blocks 202-212 occurring in a specific order, the blocks 202-212 may occur in another order. The case management system creates case roles for hierarchical case models, and provides access permissions for the created case roles, which may be based on existing access permissions for existing case roles, without the need for an application developer to create any custom code for any hierarchical case models. The case management system may create multiple instances of any hierarchical case model, with each instance already containing the complex hierarchical case model access roles and access permissions. At design time, an application developer may use a simple editor to add or delete access permissions for each case role on an as-needed basis. At run time, the application developer may assign different individuals or the same individuals to the various roles for each instance. Since the case management system assigns the complex hierarchical case model access roles for each instance of the hierarchical case model, the application developer does not have to engage in complex coding to assign the complex hierarchical case model access roles.

Figure 3:
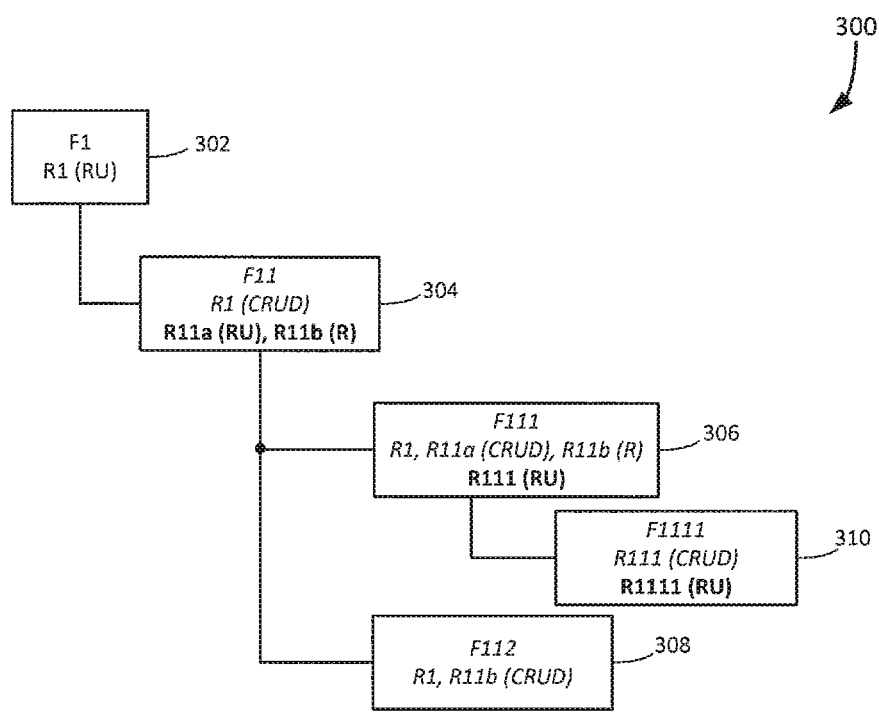
FIG. 3 is a block diagram illustrating an example case model implemented as a hierarchical tree structure, under an embodiment.

Referring to FIG. 3, an example of a hierarchical case model 300 is illustrated that may be created following the operations referenced in FIG. 2. The F1 node (block 302) represents the container, or engagement space, of the case model as a whole, and a corresponding role R1 is assigned permissions to read (R) and update/edit (U) the F1 node.

The F11 node (block 304) represents a first project container for a specific application or case that utilizes the case model that includes the F1 node. For example, the F11 node represents the case of a home loan. For hierarchical case models, the roles and permissions corresponding to the F11 node could automatically inherit the roles and permissions corresponding to the F1 node, but additional roles and permissions could be assigned or deleted. In this case model, since the F11 node represents the application level, all permissions are available to be granted to the user role R1 at this level (block 304), namely create, read, update/edit and delete (CRUD). There may be other project containers for other applications on the same level as the F11 node, utilizing the case model that includes the F1 node.

In addition, new permissions can be defined and assigned to selected roles and/or users. For example, as noted above, the F11 node represents a first object corresponding to the case model that includes the F1 node, and a first group of users, such as U1 and U2, can be assigned as members belonging to the R11a case role, and having the permissions for read (R) and update (U) (block 304). Likewise, a second group of users, such as U3 and U4, can be assigned as members belonging to the R11b case role, and having the permissions for read (R) only (block 304).

The F111 node (block 306) and the F112 node (block 308) are defined sub-nodes, or children, of the main F11 node (block 302), or parent node. The F111 node and the F112 node are therefore considered children nodes which may include references to roles and permissions that correspond to the parent node F11 node. That is, the references n to the R1 case role inherit all of the CRUD permissions for both of the F111 node and the F112 node. The reference to the first group of users R11a (including users U1 and U2) also has all CRUD permissions for the F111 node, and a sub-group of users R111 is granted read (R) and update (U) permissions only for the F111 node (block 306). The reference to the second group of users R11b is granted read (R) permissions only for the F111 node (block 306). The reference to the second group of users R11b (including the users U3 and U4) also inherits all of the CRUD permissions for the F112 node, while the reference to the first groups of users R11a is granted no access permissions for the F112 node (block 308). Similarly, the references to the roles, the roles, and the permissions corresponding to the F1111 node are listed in block 310.

Figure 4:
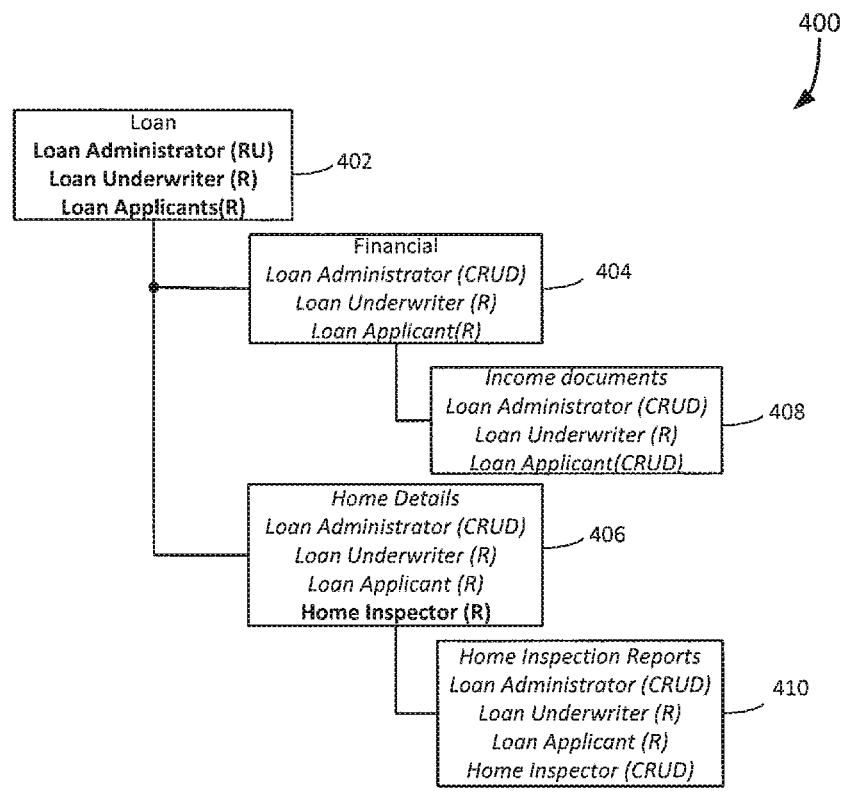
FIG. 4 is a block diagram illustrating another example case model implemented as a hierarchical tree structure, under an embodiment.

FIG. 4 illustrates a more concrete example model 400 of the hierarchical case model 300 illustrated in FIG. 3 for the case of a home loan. A loan 402 node represents the container of the case model as a whole, including loan administrator, loan underwriter, and loan applicant roles defined for the case model and assigned global permissions. For example, the loan administrator role is assigned permissions to read (R) and update/edit (U) for the loan 402 node; the loan underwriter role is assigned permission to read (R) only for the loan 402 node; and the loan applicant role is assigned permission to read (R) only for the loan 402 node.

A financial 404 node is defined to store financial documents for the loan process, such as income documents in an income documents 408 node, and a home details 406 node is defined to store documents related to home details, such as in home inspection reports 410 node. The references to roles and permissions corresponding to the financial 404 node include inherited roles and permissions from the loan 402 node. Further, the loan administrator role is granted all permissions to create (C), read (R), update/edit (U), and delete (D) the financial 404 node. The references to roles and permissions corresponding to the income documents 408 node include inherited roles and permissions from the financial 404 node. Further, the loan applicant role is granted all permissions to create (C), read (R), update/edit (U), and delete (D) the income documents 408 node.

The references to roles, roles, and permissions corresponding to the home details 406 node include inherited roles and permissions from the loan 402 node. Further, the loan administrator role is granted all permissions to create (C), read (R), update/edit (U), and delete (D) for the home details 406 node. In addition, a new role is defined at this level, namely, the home inspector role, and is assigned permission to read (R) only for the home details 406 node.

The references to roles and permissions that correspond to the home inspection reports 410 node include inherited roles and permissions from the home details 406 node. In this scenario, the home inspector role is also assigned all of the permissions to create (C), read (R), update/edit (U), and delete (D) the home inspection reports 410 node.

Figure 5:
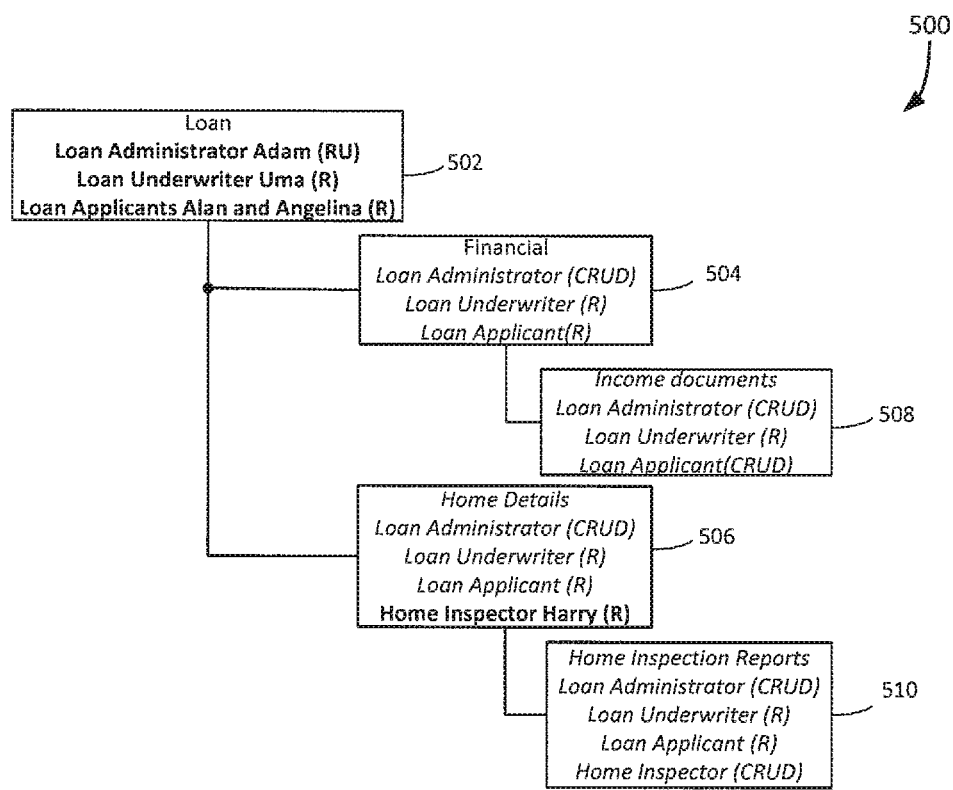
FIG. 5 is a block diagram illustrating yet another example case model implemented as a hierarchical tree structure, under an embodiment.

FIG. 5 illustrates an example instance 500 of the hierarchical case model 400 illustrated in FIG. 4 for the case of a home loan. The example instance 500 could be for "Loan 123," in which specific individuals are assigned case roles at runtime. For example, Adam is assigned the loan administrator case role, Uma is assigned the loan underwriter case role, both Alan and Angelia are assigned the loan applicants case role, and Harry is assigned the home inspector case role for the "Loan 123" example instance 500 of the hierarchical case model 400.

Figure 6:
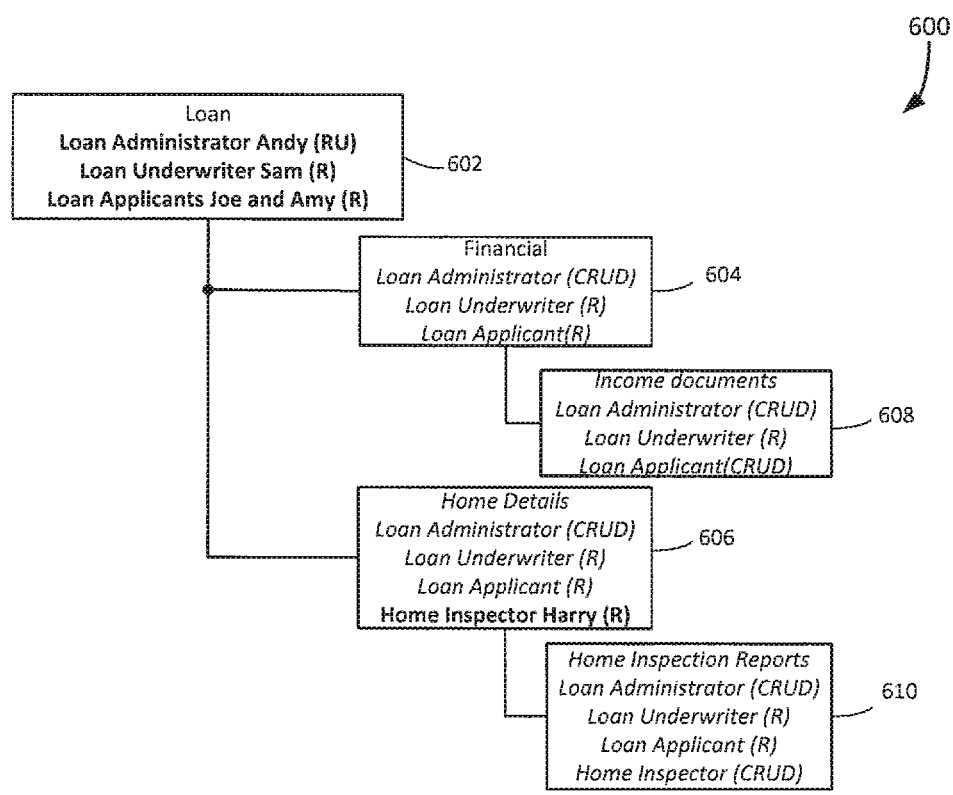
FIG. 6 is a block diagram illustrating a further example case model implemented as a hierarchical tree structure, under an embodiment.

FIG. 6 illustrates another example instance 600 of the hierarchical case model 400 illustrated in FIG. 4 for the case of a home loan. The example instance 600 could be for "Loan 456," in which the individuals who are assigned the case roles could be entirely different from the individuals who assume the case roles for the "Loan 123." For example, Andy is assigned the loan administrator case role, Sam is assigned the loan underwriter case role, both Joe and Amy are assigned the loan applicants case role, and Harry is assigned the home inspector case role of the "Loan 456" instance of the hierarchical case model 400. For these examples, other than Harry, who coincidentally assumes the home inspector case role for both instances 500 and 600, the individuals who are assigned the case roles for the "Loan 123" would have none of the access permissions for the "Loan 456," and the individuals who are assigned the case roles for the "Loan 456" would have none of the access permissions for the "Loan 123."

Each case model instance may go through several phases, such as loan initiation, review, underwriting, and closed. The case management system may implement various actions based on phase changes, such as changing all access permissions to read only when a case model instance enters into the closed phase. The case management system may implement event triggers based on phase changes or based on either any case model instance or case node being created, thereby triggering a stateful/stateless process or an action such as sending an email.

A meta-model to describe the hierarchical case model access roles and permissions described above may be expressed in any modeling language. For example, FIG. 5 illustrates an example designed using the Eclipse Modeling Framework. Lines 1-3 indicate that the case management system creates a container, or engagement space, for a "case model" that is modeled with a "data model" with specific instances of "case nodes." Lines 4-15 define the data model in terms of a lifecycle, case roles, permissions, and other useful characteristics, such as anchor points for additional disclosure re phases, events and placeholders of other applications. Lines 16-30 further define the permissions.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for hierarchical case model access roles and permissions, the system comprising:
 a processor-based application executed on a computer and configured to:
  create a hierarchical case model including a parent node and a child node associated with the parent node;
  associate a plurality of case roles with the parent node, wherein each case role has a plurality of access permissions assigned thereto at a parent node level;
  create, for the child node, a reference to a first case role of the plurality of case roles associated with the parent node, the first case role having a plurality of access permissions assigned to the first case role;
  selectively assign to the reference a first set of access permissions, the first set of access permissions including a sub-set of access permissions from the plurality of access permissions assigned to the first case role at the parent node level and one or more access permissions absent from the plurality of access permissions assigned to the first case role at the parent node level; and
  in response to a request to access the child node, determine access to the child node based on the first set of access permissions.

2. The system of claim 1, wherein the first set of permissions is assigned from a group comprising create permission, read permission, update permission, delete permission, and no access permission.

3. The system of claim 1, wherein assigning the first set of access permissions to the reference is based on inheriting another set of access permissions associated with the first case role.

4. The system of claim 1, wherein assigning the first set of access permissions to the reference comprises deleting an access permission from the reference that is present in another set of access permissions associated with the first case role.

5. The system of claim 1, wherein the processor-based application is further configured to:
 create an additional case role for the child node;
 assign an additional set of access permissions to the additional case role; and
 determine access to the child node based on the additional set of access permissions in response to a request associated with the additional case role to access the child node.

6. The system of claim 1, wherein the processor-based application is further configured to delete the reference from the child node.

7. A computer-implemented method for hierarchical case model access roles and permissions, the method comprising:
 creating a hierarchical case model including a parent node and a child node associated with the parent node;
 associating a plurality of case roles with the parent node, wherein each case role has a plurality of access permissions assigned thereto at a parent node level;
 creating, for the child node, a reference to a first case role of the plurality of case roles associated with the parent node, the first case role having a plurality of access permissions assigned to the first case role;
 selectively assigning to the reference a first set of access permissions, the first set of access permissions including a sub-set of access permissions from the plurality of access permissions assigned to the first case role at the parent node level and one or more access permissions absent from the plurality of access permissions assigned to the first case role at the parent node level; and
 in response to a request to access the child node, determining access to the child node based on the first set of access permissions.

8. The method of claim 7, wherein the first set of permissions is assigned from a group comprising create permission, read permission, update permission, delete permission, and no access permission.

9. The method of claim 7, wherein assigning the first set of access permissions to the reference is based on inheriting another set of access permissions associated with the first case role.

10. The method of claim 7, wherein assigning the first set of access permissions to the reference comprises deleting an access permission from the reference that is present in another set of access permissions associated with the first case role.

11. The method of claim 7, wherein the method further comprises:
 creating an additional case role for the child node;
 assigning an additional set of access permissions to the additional case role; and determining access to the child node based on the additional set of access permissions in response to a request associated with the additional case role to access the child node.

12. A computer program product, comprising a non-transitory computer-readable medium having a computer-readable program code embodied therein to be executed by one or more processors, the program code including instructions to:
 create a hierarchical case model including a parent node and a child node associated with the parent node;

associate a plurality of case roles with the parent node, wherein each case role has a plurality of access permissions assigned thereto at a parent node level;

create, for the child node, a reference to a first case role of the plurality of case roles associated with the parent node, the first case role having a plurality of access permissions assigned to the first case role;

selectively assign to the reference a first set of access permissions, the first set of access permissions including a sub-set of access permissions from the plurality of access permissions assigned to the first case role at the parent node level and one or more access permissions absent from the plurality of access permissions assigned to the first case role at the parent node level; and in response to a request to access the child node, determine access to the child node based on the first set of access permissions.

13. The computer program product of claim 12, wherein the first set of permissions is assigned from a group comprising create permission, read permission, update permission, delete permission, and no access permission.

14. The computer program product of claim 12, wherein assigning the first set of access permissions to the reference is based on inheriting another set of access permissions associated with the first case role.

15. The computer program product of claim 12, wherein assigning the first set of access permissions to the reference comprises deleting an access permission from the reference that is present in another set of access permissions associated with the first case role.

16. The computer program product of claim 12, wherein the program code includes further instructions to:

create an additional case role for the child node;

assign an additional set of access permissions to the additional case role; and determine access to the child node based on the additional set of access permissions in response to a request associated with the additional case role to access the child node.

17. The computer program product of claim 12, wherein the program code includes further instructions to delete the reference from the child node.

* * * * *